United States Patent
Jin

(10) Patent No.: US 9,709,780 B2
(45) Date of Patent: Jul. 18, 2017

(54) VARIABLE MAGNIFICATION OBSERVATION OPTICAL SYSTEM

(71) Applicant: KONICA MINOLTA, INC., Chiyoda-ku (JP)

(72) Inventor: Makoto Jin, Chiyoda-ku (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/888,173

(22) PCT Filed: May 1, 2014

(86) PCT No.: PCT/JP2014/062061
§ 371 (c)(1),
(2) Date: Oct. 30, 2015

(87) PCT Pub. No.: WO2014/181750
PCT Pub. Date: Nov. 13, 2014

(65) Prior Publication Data
US 2016/0170188 A1  Jun. 16, 2016

(30) Foreign Application Priority Data
May 8, 2013 (JP) ................. 2013-098172

(51) Int. Cl.
*G02B 15/16* (2006.01)
*G02B 25/00* (2006.01)
(Continued)

(52) U.S. Cl.
CPC ........... *G02B 15/163* (2013.01); *G02B 23/00* (2013.01); *G02B 25/001* (2013.01); *G02B 27/0025* (2013.01)

(58) Field of Classification Search
CPC ........ G02B 15/00; G02B 15/14; G02B 15/15; G02B 15/163; G02B 15/167; G02B 23/00;
(Continued)

(56) References Cited

U.S. PATENT DOCUMENTS 4,183,624 A * 1/1980 Rogers ................. G02B 25/001
359/767
5,504,624 A * 4/1996 Kato .................... G02B 15/173
359/676

(Continued)

FOREIGN PATENT DOCUMENTS

JP  05-005840    1/1993
JP  2003-315687  11/2003
(Continued)

Primary Examiner — Stephone B Allen
Assistant Examiner — Adam W Booher
(74) Attorney, Agent, or Firm — Cozen O'Connor

(57) ABSTRACT

These variable-magnification observation optical systems are provided with an objective system, an erecting system, and an eyepiece system. In order from the object side, the objective system has a positive first lens group, a positive second lens group, and a negative third lens group. In order from the object side, the eyepiece system has a positive fourth lens group and a positive fifth lens group. The erecting system is located between the first and second lens groups. In order from the object side, the fifth lens group has the following, with air gaps in between: a negative meniscus lens element, the concave surface of which faces the object side; a negative meniscus lens element, the convex surface of which faces the object side; and a biconvex positive lens element.

11 Claims, 12 Drawing Sheets

EX1

(51) Int. Cl.
*G02B 27/00* (2006.01)
*G02B 15/163* (2006.01)
*G02B 23/00* (2006.01)

(58) Field of Classification Search
CPC .. G02B 23/14; G02B 23/2438; G02B 25/001; G02B 27/0025; G02B 27/0189; G02B 13/00; G02B 13/02; G02B 9/12; G02B 9/34; G02B 9/60; G02B 9/62; G02B 9/64; F41G 1/00; F41G 1/02; F41G 1/027; F41G 1/06; F41G 1/14; F41G 1/38
USPC ....... 359/432, 646, 659–661, 680, 682, 735, 359/784
See application file for complete search history.

(56) References Cited

U.S. PATENT DOCUMENTS

| | | | | |
|---|---|---|---|---|
| 6,094,310 | A * | 7/2000 | Hankawa | G02B 25/001 359/643 |
| 6,181,479 | B1 * | 1/2001 | Koizumi | G02B 25/001 359/643 |
| 2003/0202254 | A1 | 10/2003 | Kanai | |
| 2004/0095642 | A1 | 5/2004 | Watanabe | |

FOREIGN PATENT DOCUMENTS

| | | |
|---|---|---|
| JP | 2004-139065 | 5/2004 |
| JP | 2012-252241 | 12/2012 |

* cited by examiner

EX1, W

-2　0　2
SPHERICAL ABERRATION(Dpt)

EX1, W

-2　0　2
ASTIGMATISM(Dpt)

EX1, W

-5　0　5
DISTORTION ABERRATION(%)

EX1, T

-2　0　2
SPHERICAL ABERRATION(Dpt)

EX1, T

-2　0　2
ASTIGMATISM(Dpt)

EX1, T

-5　0　5
DISTORTION ABERRATION(%)

EX2, W

-2　0　2
SPHERICAL ABERRATION(Dpt)

EX2, W

-2　0　2
ASTIGMATISM(Dpt)

EX2, W

-5　0　5
DISTORTION ABERRATION(%)

EX2, T

-2　0　2
SPHERICAL ABERRATION(Dpt)

EX2, T

-2　0　2
ASTIGMATISM(Dpt)

EX2, T

-5　0　5
DISTORTION ABERRATION(%)

EX3, W

SPHERICAL
ABERRATION(Dpt)

EX3, W

ASTIGMATISM(Dpt)

EX3, W

DISTORTION
ABERRATION(%)

EX3, T

SPHERICAL
ABERRATION(Dpt)

EX3, T

ASTIGMATISM(Dpt)

EX3, T

DISTORTION
ABERRATION(%)

EX4, W

SPHERICAL ABERRATION(Dpt)

EX4, W

ASTIGMATISM(Dpt)

EX4, W

DISTORTION ABERRATION(%)

EX4, T

SPHERICAL ABERRATION(Dpt)

EX4, T

ASTIGMATISM(Dpt)

EX4, T

DISTORTION ABERRATION(%)

VARIABLE MAGNIFICATION OBSERVATION OPTICAL SYSTEM

RELATED APPLICATIONS

This is a U.S. National stage of International application No. PCT/JP2014/062061 filed on May 1, 2014.

This patent application claims the priority of Japanese application no. 2013-098172 filed May 8, 2013 the disclosure content of which is hereby incorporated by reference.

TECHNICAL FIELD

The present invention relates to variable-magnification observation optical systems, and specifically relates to variable-magnification observation optical systems for use in, for example, medical magnifiers, working magnifiers, binoculars, and terrestrial telescopes.

BACKGROUND ART

Conventionally, in observation optical systems used in, for example, magnifiers, binoculars, and terrestrial telescopes, there has commonly been adopted a so-called Keplerial type (real-image type) arrangement, in which an inverted image formed by an objective system is converted into an erect image by an erecting system such as a prism, and the erect image is observed through an eyepiece system. On the other hand, in zoom optical systems having a zoom ratio of about 2×, which are easy to make compact, there has commonly been adopted a zoom type arrangement, in which zooming is performed by a pair of lens elements between which the inverted image is located. Patent Literature 1, for example, proposes a variable-magnification optical system in which the most pupil-side lens group in the eyepiece system is composed of cemented lens elements for the purpose of correcting longitudinal chromatic aberration.

CITATION LIST

Patent Literature

Patent Literature 1: Japanese Patent Application Publication No. 2003-315687

SUMMARY OF INVENTION

Technical Problem

With the variable-magnification optical system disclosed in Patent Literature 1, in which the most pupil-side lens group in the eyepiece system is composed only of a pair of cemented lens elements, it is difficult to achieve satisfactory aberration correction at both central and peripheral portions simultaneously.

The present invention has been made against the background of such circumstances, and an object thereof is to provide a compact variable-magnification observation optical system capable of performing satisfactory correction of various aberrations over an entire field of view from center to periphery.

Solution to Problem

To achieve the above object, according to a first aspect of the present invention, a variable-magnification observation optical system is of a real-image type and includes an objective system, an erecting system that converts an inverted image formed by the objective system into an erect image, and an eyepiece system that allows the erect image formed by the erecting system to be observed with a pupil. Here, the objective system includes, in order from an object side, a first lens group having a positive optical power, a second lens group having a positive optical power, and a third lens group having a negative optical power; the eyepiece system includes, in order from the object side, a fourth lens group having a positive optical power, and a fifth lens group having a positive optical power; the erecting system is positioned between the first lens group and the second lens group; zooming from a low magnification end to a high magnification end is performed by moving the third lens group and the fourth lens group in opposite directions from each other along an optical axis, with an image plane positioned between the third lens group and the fourth lens group; and the fifth lens group includes, in order from the object side, a negative meniscus lens element concave to the object side, a negative meniscus lens element convex to the object side, and a biconvex positive lens element, which are arranged with an air gap provided between each adjacent ones thereof.

According to a second aspect of the present invention, in the variable-magnification observation optical system according to the first aspect of the present invention, the second lens group and the third lens group are each composed of a single lens element.

According to a third aspect of the present invention, in the variable-magnification observation optical system according to the first or second aspect of the present invention, lens surfaces constituting the fifth lens group are each spherical.

According to a fourth aspect of the present invention, in the variable-magnification observation optical system according to any one of the first to third aspects of the present invention, conditional formula (1) below is fulfilled:

$$0.2 < LT5/f_{ew} < 0.3 \quad (1)$$

where, the negative meniscus lens element concave to the object side in the fifth lens group being referred to as a 5-1st lens element, the positive lens element in the fifth lens group being referred to as a 5-3rd lens element, LT5 represents a distance on the optical axis from a pupil-side surface of the 5-1st lens element to an object-side surface of the 5-3rd lens element; and $f_{ew}$ represents a focal length of the eyepiece system at the low magnification end.

According to a fifth aspect of the present invention, in the variable-magnification observation optical system according to any one of the first to fourth aspects of the present invention, conditional formula (2) below is fulfilled:

$$0.5 < f4/f_{ew} < 0.8 \quad (2)$$

where f4 represents a focal length of the fourth lens group; and $f_{ew}$ represents a focal length of the eyepiece system at the low magnification end.

According to a sixth aspect of the present invention, in the variable-magnification observation optical system according to any one of the first to fifth aspects of the present invention, conditional formula (3) below is fulfilled:

$$3 < (Rb+Ra)/(Rb-Ra) < 5 \quad (3)$$

where, the negative meniscus lens element concave to the object side in the fifth lens group being referred to as a 5-1st lens element, Ra represents a curvature radius of an object-side surface of the 5-1st lens element; and Rb represents a curvature radius of a pupil-side surface of the 5-1st lens element.

According to a seventh aspect of the present invention, in the variable-magnification observation optical system according to any one of the first to sixth aspects of the present invention, conditional formula (4) below is fulfilled:

$$0.4 < f34t/f34w < 0.7 \qquad (4)$$

where f34w represents a composite focal length of the third lens group and the fourth lens group at the low magnification end; and f34t represents a composite focal length of the third lens group and the fourth lens group at the high magnification end.

According to an eighth aspect of the present invention, in the variable-magnification observation optical system according to any one of the first to seventh aspects of the present invention, the first lens group, the second lens group, and the fifth lens group remain stationary in a direction of the optical axis during zooming.

According to a ninth aspect of the present invention, in the variable-magnification observation optical system according to any one of the first to eighth aspects of the present invention, the fourth lens group is composed of a single lens element.

Advantageous Effects of Invention

According to the present invention, it is possible to achieve a compact variable-magnification observation optical system capable of performing satisfactory correction of various aberrations over an entire field of view from center to periphery.

DESCRIPTION OF EMBODIMENTS

Figure 1:
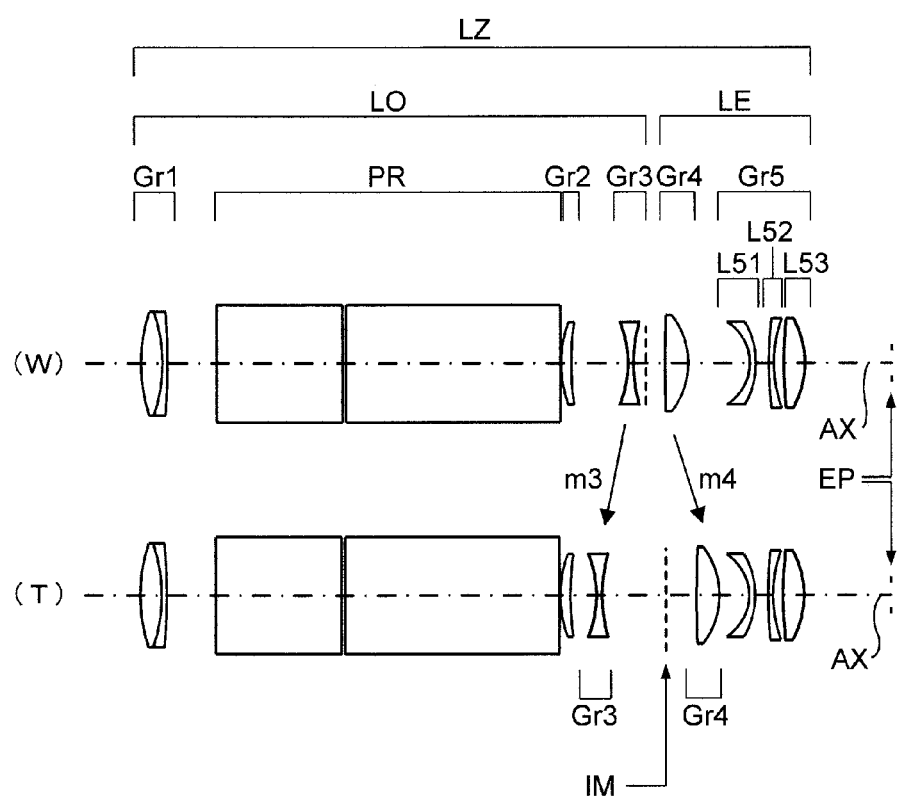
FIG. 1 is an optical configuration diagram of a first embodiment (Example 1)

Hereinafter, descriptions will be given of a variable-magnification observation optical system according to the present invention. According to the present invention, a variable-magnification observation optical system is of a real-image type and includes an objective system, an erecting system that converts an inverted image formed by the objective system into an erect image, and an eyepiece system that allows the erect image formed by the erecting system to be observed with a pupil. The objective system includes, in order from an object side, a first lens group having a positive optical power, a second lens group having a positive optical power, and a third lens group having a negative optical power; the eyepiece system includes, in order from the object side, a fourth lens group having a positive optical power and a fifth lens group having a positive optical power (here, optical power is an amount defined by the reciprocal of a focal length); and the erecting system is positioned between the first lens group and the second lens group. Furthermore, zooming from a low magnification end to a high magnification end is performed by moving the third lens group and the fourth lens group in opposite directions from each other along an optical axis with an image plane positioned between the third lens group and the fourth lens group. Moreover, the fifth lens group includes, in order from the object side, a negative meniscus lens element concave to the object side, a negative meniscus lens element convex to the object side, and a biconvex positive lens element, which are arranged with an air gap provided between each adjacent ones thereof.

As compared with a virtual-image type, a real-image type observation optical system including an objective system, an erecting system, and an eyepiece system is advantageous in that the diameter of the objective system can be reduced. Moreover, by disposing the second lens group having a positive optical power on a pupil side of the erecting system, a pupil conjugate position can be disposed within, or in the vicinity of, the erecting system. As a result, the width of light passing through the erecting system can be reduced, and thus the erecting system can be formed compact, as a result of which the entire observation optical system can be made lightweight and compact. Furthermore, adoption of the zoom configuration where the third lens group and the fourth lens group move in opposite directions with the image plane positioned therebetween makes it possible to perform zooming without inviting increase in the length of the entire optical system.

The design of the fifth lens group with the negative-positive lens arrangement makes it possible to obtain an effect of correcting longitudinal chromatic aberration. Furthermore, the arrangement of the negative meniscus lens element convex to the object side (the 5-2nd lens element) and the biconvex positive lens element (the 5-3rd lens element) via an air gap (out of contact from each other) makes it possible to obtain an effect of achieving satisfactory correction of spherical aberration, etc. Moreover, the provision of the negative meniscus lens element (the 5-1st lens element) concave to the object side makes it possible to obtain an effect of achieving satisfactory correction of not only axial aberrations but also off-axis aberrations such as field curvature. In addition, by largely bending a light ray by means of the object-side concave surface of the 5-1st lens element, it is possible to obtain an effect of achieving size reduction of the fifth lens group even in the diameter direction.

Thus, with the characteristic configurations described above, it is possible to achieve a compact variable-magnification observation optical system capable of performing satisfactory correction of various aberrations over the entire field of view, from center to periphery. Descriptions will be given below of conditions and the like for obtaining these effects in a well-balanced manner and further achieving advantages including high optical performance, miniaturization, and the like.

It is preferable that the second lens group and the third lens group be each composed of a single lens element. The use of the single lens elements makes it possible to obtain an effect of achieving weight reduction and preventing increase of the length of the entire optical system. For example, by constituting the second lens group and the third lens group each with a single lens element, it is possible to effectively prevent increase of the length of the entire optical system, and by constituting the third lens group, which is movable during zooming, with a single lens element, a resulting weight reduction of the third lens group helps reduce lens driving load. Furthermore, it is possible to make structural members compact and lightweight, and thus to obtain an effect of simplifying the zoom mechanism and preventing increase in weight of the zoom mechanism.

It is preferable that lens surfaces constituting the fifth lens group each be spherical. By using only spherical lens elements as lens elements constituting the fifth lens group, it is possible to achieve cost reduction of the variable-magnification observation optical system.

It is preferable that conditional formula (1) below be fulfilled:

$$0.2 < LT5/\text{few} < 0.3 \qquad (1)$$

where, the negative meniscus lens element concave to the object side in the fifth lens group being referred to as the 5-1st lens element, the positive lens element in the fifth lens group being referred to as the 5-3rd lens element, LT5 represents a distance on the optical axis from a pupil-side surface of the 5-1st lens element to an object-side surface of the 5-3rd lens element; and few represents a focal length of the eyepiece system at the low magnification end.

Aberration correction is performed on an axial light beam and a peripheral light beam by using different ranges on the 5-1st lens element. To correct aberrations in this manner, it is necessary to dispose the 5-1st lens element and the 5-3rd lens element spaced from each other by a predetermined distance or longer. Above the upper limit of the conditional formula (1), the fifth lens group has such a long length that it is difficult to make the entire optical system compact. Below the lower limit of the conditional formula (1), the distance from the 5-1st lens element to the 5-3rd lens element is so short that it is difficult to use different ranges to correct axial and peripheral aberrations in the 5-1st lens element. This makes it difficult to satisfactorily correct axial and peripheral aberrations simultaneously. Hence, by fulfilling conditional formula (1), miniaturization and high performance of the observation optical system can be achieved in a balanced manner.

It is preferable that conditional formula (2) below be fulfilled:

$$0.5 < f4/\text{few} < 0.8 \qquad (2)$$

where f4 represents a focal length of the fourth lens group; and few represents the focal length of the eyepiece system at the low magnification end.

Above the upper limit of the conditional formula (2), the relative optical power of the fourth lens group is reduced, and this requires the fourth lens group to move by a larger amount during zooming. This accordingly makes it difficult to achieve a compact optical system. Below the lower limit of conditional formula (2), astigmatism, coma aberration, etc. occurring in the fourth lens group increase, and it is difficult to correct them satisfactorily by means of the fifth lens group. Hence, by fulfilling conditional formula (2), miniaturization and high performance of the observation optical system can be achieved in a balanced manner.

It is further preferable that conditional formula (2a) below be fulfilled:

$$0.6 < f4/\text{few} < 0.75 \qquad (2a)$$

Conditional formula (2a) described above specifies, in the range of the conditions specified by conditional formula (2) described further above, a further preferable range of conditions based on the above-described viewpoints, etc. Hence, by fulfilling conditional formula (2a), it is possible to further enhance the above-described advantages.

It is preferable that conditional formula (3) below be fulfilled:

$$3 < (Rb+Ra)/(Rb-Ra) < 5 \qquad (3)$$

where, the negative meniscus lens element concave to the object side in the fifth lens group being referred to as the 5-1st lens element, Ra represents a curvature radius of an object-side surface of the 5-1st lens element; and Rb represents a curvature radius of the pupil-side surface of the 5-1st lens element.

Conditional formula (3) specifies a preferable range of conditions regarding the shapes of the surfaces of the 5-1st lens element. Above the upper limit of conditional formula (3), a light-ray passing position in the 5-1st lens element is high, and this requires an increased lens diameter of the fifth lens group, making it difficult to achieve reduction in size and weight. Below the lower limit of conditional formula (3), the curvature on the object side is strong, which makes it difficult to perform surface processing. Hence, by fulfilling conditional formula (3), weight reduction, miniaturization, and high performance of the observation optical system can be achieved in a balanced manner. Incidentally, shapes of lens surfaces are indicated based on paraxial curvatures.

It is further preferable that conditional formula (3a) below be fulfilled:

$$3.5 < (Rb+Ra)/(Rb-Ra) < 4.6 \qquad (3a)$$

Conditional formula (3a) described above specifies, in the range of the conditions specified by conditional formula (3) described further above, a further preferable range of conditions based on the above-described viewpoints, etc. Hence, it is preferable to fulfill conditional formula (3a), which makes it possible to further enhance the above-described advantages.

It is preferable that conditional formula (4) below be fulfilled:

$$0.4 < f34t/f34w < 0.7 \qquad (4)$$

where f34w represents a composite focal length of the third lens group and the fourth lens group at the low magnification end; and f34t represents a composite focal length of the third lens group and the fourth lens group at the high magnification end.

Above the upper limit of conditional formula (4), the fourth lens group contributes less to zooming, forcing the third lens group to contribute more to zooming. Accordingly the third lens group is forced to move more during zooming, and this makes it difficult to achieve miniaturization. Below the lower limit of conditional formula (4), conversely, the fourth lens group contributes relatively more to zooming and thus moves more, and this also makes it difficult to achieve miniaturization. Hence, by fulfilling conditional formula (4), miniaturization of the observation optical system can be achieved while maintaining high optical performance.

It is further preferable that conditional formula (4a) below be fulfilled:

$$0.5 < f34t/f34w < 0.65 \quad (4a)$$

Conditional formula (4a) described above specifies, in the range of the conditions specified by conditional formula (4) described further above, a further preferable range of conditions based on the above-described viewpoints, etc. Hence, it is preferable to fulfill conditional formula (4a), which makes it possible to further enhance the above-described advantages.

It is preferable that the first lens group, the second lens group, and the fifth lens group remain stationary in the direction of the optical axis during zooming. By allowing only two lens groups, namely, the third lens group and the fourth lens group, to be movable, it is possible to achieve a simple zooming mechanism. Thus, the arrangement in which the first, second, and fifth lens groups are stationary lens groups makes it possible to obtain an effect of preventing increase in weight of the entire unit. Further, the arrangement where the first and fifth lens groups, both of which face outside, are stationary lens groups makes it possible to configure a variable-magnification observation optical system that is advantageous in a waterproof and dustproof structure.

It is preferable that the fourth lens group be composed of a single lens element. By constituting the fourth lens group, which is movable during zooming, with a single lens element, it is possible to prevent increase in weight of the fourth lens group, and thus to achieve reduction in lens driving load. Furthermore, it is possible to make structural members compact and lightweight, and thus to obtain an effect of simplifying the zoom mechanism and preventing increase in weight of the zoom mechanism.

It is preferable that a most object-side lens element and a most pupil-side lens element be each formed of a glass material. In circumstances such as out-of-doors, manufacturing sites, inspection processes, and medical sites, lens surfaces exposed to outside are often left uncovered, and thus frequent attachment and detachment tends to become a burden on the most object-side and most pupil-side lens elements. In view of this, it is preferable that the most object-side lens element and the most pupil-side lens element, which are required to have characteristics including robustness, chemical resistance, and water resistance, each be formed of a glass material.

It is preferable that the most object-side lens element be formed of a glass material that fulfills conditional formula (5) below:

$$DA1 < 0.35 \quad (5)$$

where

DA1 represents a value (%) indicating acid resistance calculated by a method of putting powder of the glass material into nitric acid solution with a concentration of 0.01 mol/l, heating the nitric acid solution in a boiling bath, and measuring a mass reduction (%) of the powder of the glass material as the value indicating the acid resistance.

Conditional formula (5) specifies a preferable range of acid resistance that the glass material used for the most object-side lens element should have. For example, considering medical use and the like, the glass material needs to be so acid resistant as to be less prone to be affected by adhesion of chemicals. By forming the most object-side lens element with a glass material that fulfills conditional formula (5), it is possible to prevent degradation of the optical performance caused by, for example, adhesion of chemicals. Above the upper limit of conditional formula (5), when the lens element is exposed to the outside environment in an uncovered state, a chemical reaction such as tarnish may be caused, which degrades the optical property. Here, the above-mentioned values and measurement method, and values corresponding to later-described conditional formulae are based on descriptions in an optical glass catalogue of HOYA CORPORATION or on descriptions in an optical glass catalogue of SUMITA Optical glass, Inc.

It is preferable that the most object-side lens element described above fulfill one of or both of conditional formulae (6) and (7):

$$Hk1 > 350 \quad (6)$$

$$DS1 < 0.2 \quad (7)$$

where

Hk1 represents Knoop hardness; and

DS1 represents a mass reduction per unit area [mg/($cm^2 \cdot h$)] measured after a glass specimen with a 43.7 mm diameter (with a total surface area of 30 $cm^2$) and approximately 5 mm thickness, polished on both surfaces, is immersed for one hour in a 0.01 mol/l $Na_5P_3O_{10}$ water solution, at 50° C. and stirred well.

Conditional formula (6) specifies a preferable Knoop hardness of the most object-side lens element, while conditional formula (7) specifies a preferable latent-flaw resistance of the most-object side lens element. A glass material fulfilling conditional formulae (6) and (7) is excellent in these properties, it is possible to solve the previously mentioned problems by constituting the most object-side lens element with a glass lens element that fulfills at least one of conditional formulae (6) and (7). Here, the above-mentioned values and measurement method, and values corresponding to later-described conditional formulae are based on descriptions in the optical glass catalogue of HOYA CORPORATION or on descriptions in the optical glass catalogue of SUMITA Optical glass, Inc.

Figure 2:
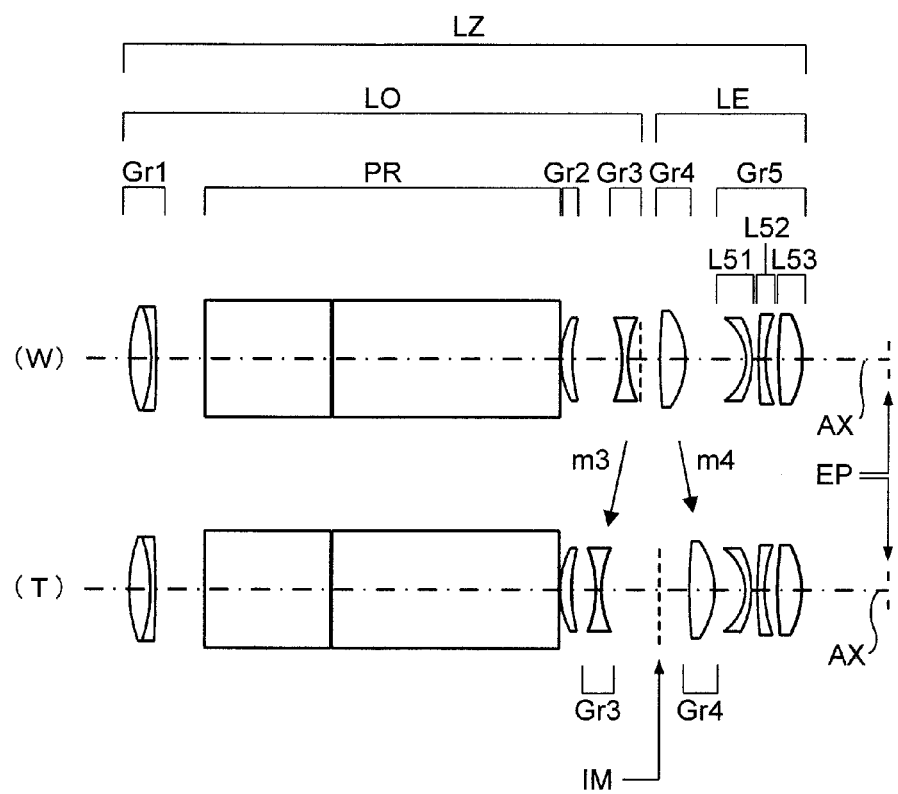
FIG. 2 is an optical configuration diagram of a second embodiment (Example 2)
Figure 3:
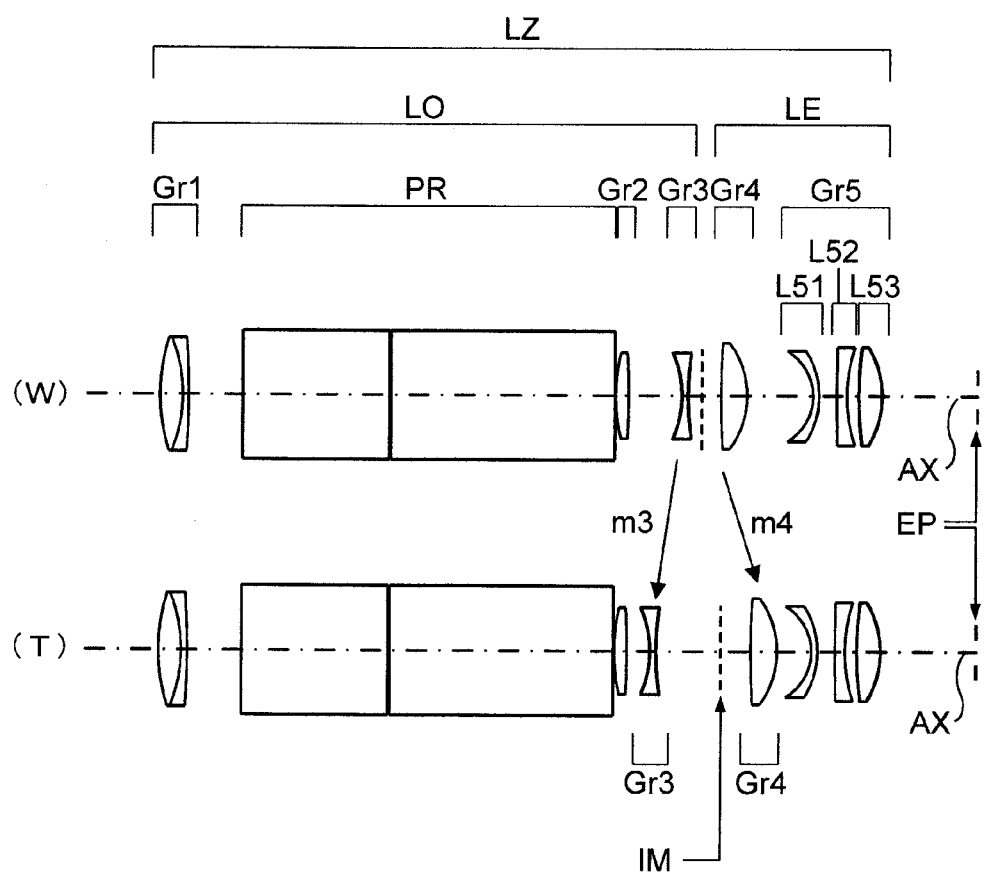
FIG. 3 is an optical configuration diagram of a third embodiment (Example 2)
Figure 4:
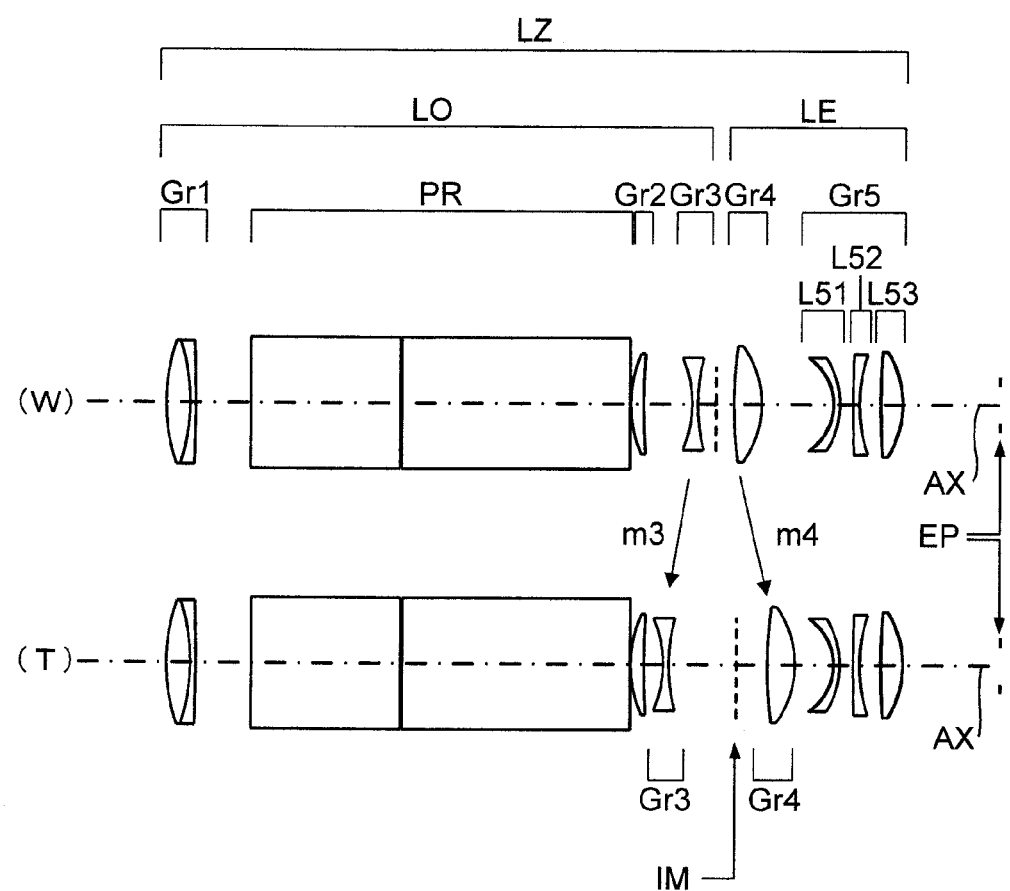
FIG. 4 is an optical configuration diagram of a fourth embodiment (Example 4)
Figure 5:
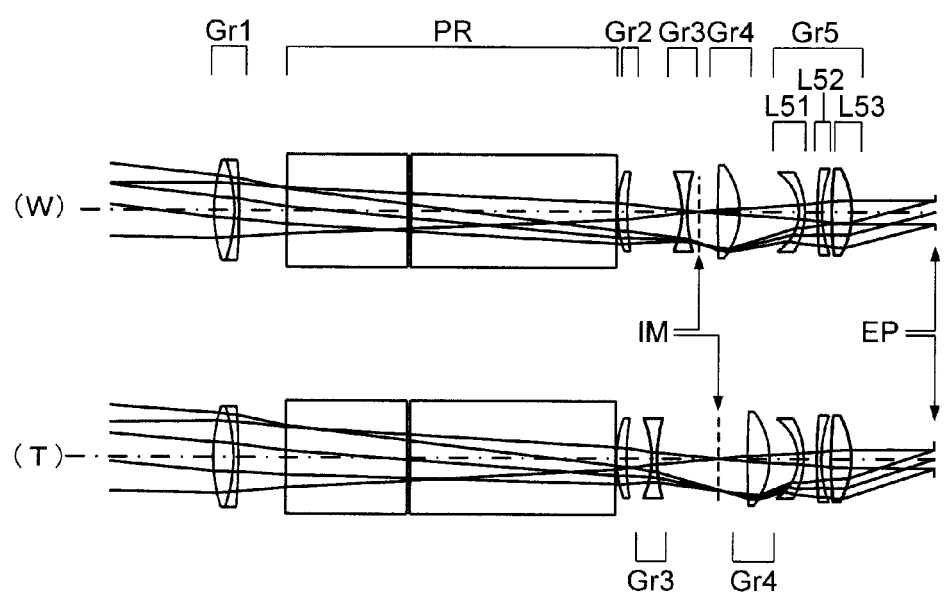
FIG. 5 is an optical path diagram of the first embodiment (Example 1)
Figure 6:
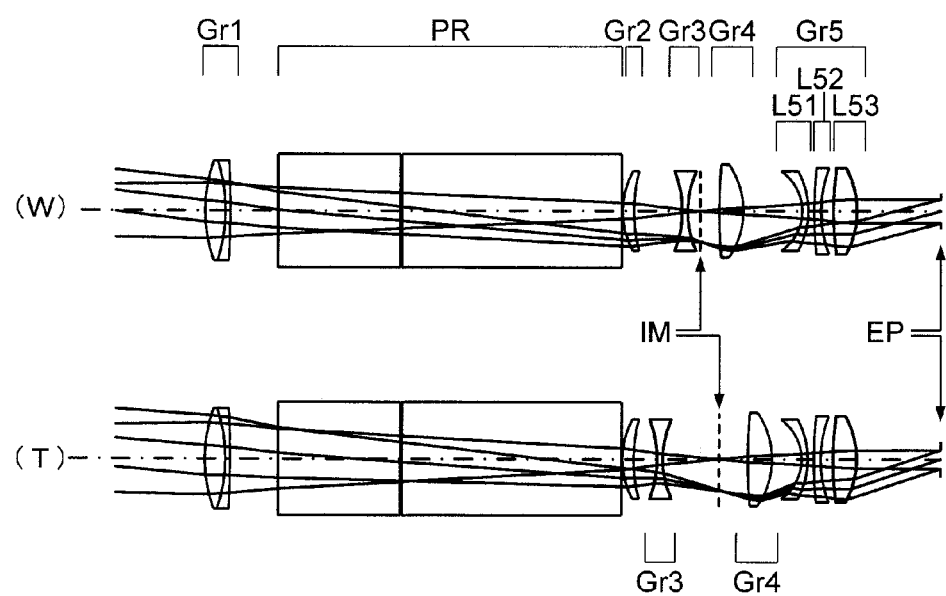
FIG. 6 is an optical path diagram of the second embodiment (Example 2)
Figure 7:
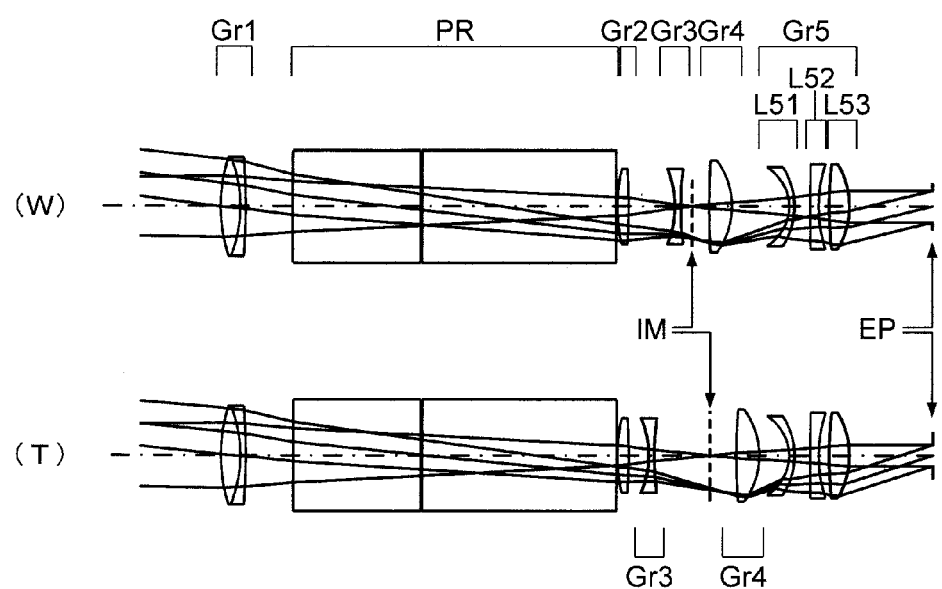
FIG. 7 is an optical path diagram of the third embodiment (Example 3)
Figure 8:
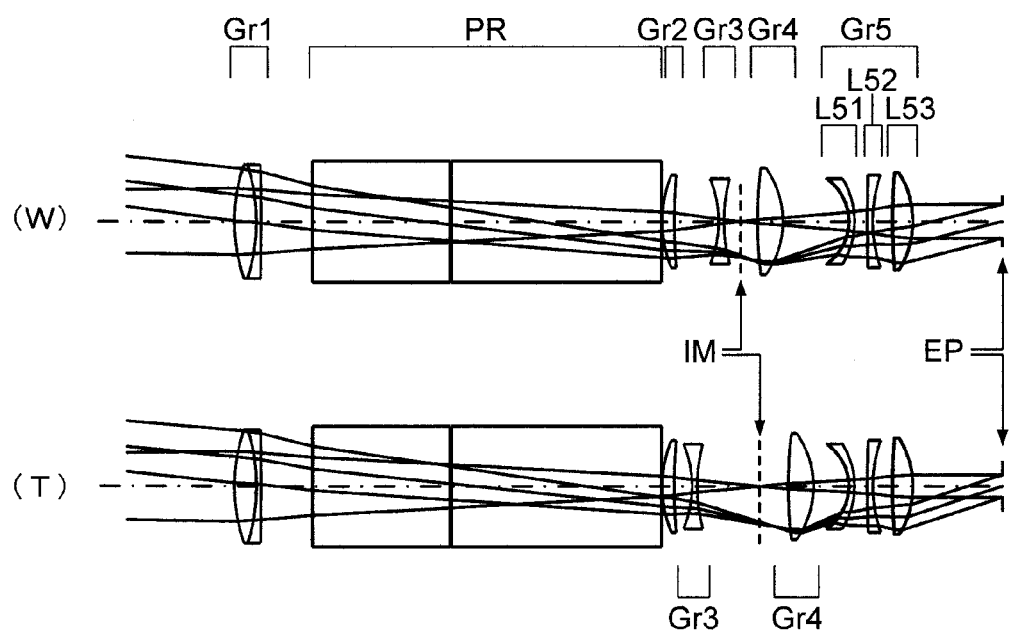
FIG. 8 is an optical path diagram of the fourth embodiment (Example 4)

Next, further detailed descriptions will be given of specific optical configurations of the variable-magnification observation optical system, by means of first to fourth embodiments. FIGS. 1 to 4 are optical configuration diagrams respectively corresponding to variable-magnification observation optical systems LZ of the first to fourth embodiments. The figures are optical sectional views showing lens arrangements at the low magnification end (W) and the high magnification end (T). FIGS. 5 to 8 are optical path diagrams respectively corresponding to the variable-magnification observation optical systems LZ of the first to fourth embodiments, showing optical paths at the low magnification end (W) and the high magnification end (T).

The variable-magnification observation optical systems LZ each have a five-group design with a positive-positive-negative-positive-positive optical power arrangement, where an objective system LO, which includes a first lens group Gr1, a second lens group Gr2, and a third lens group Gr3, and an eyepiece system LE, which includes a fourth lens group Gr4 and a fifth lens group Gr5, together constitute a substantially afocal real-image type observation optical system, and an erecting system PR is positioned between the first lens group Gr1 and the second lens group Gr2 such that an erect image IM can be observed with a pupil EP (see FIGS. 1 to 8). During zooming from the low magnification end (W) to the high magnification end (T), magnification change (that is, zooming) is performed by the third lens group Gr3 and the fourth lens group Gr4 moving in opposite directions from each other along an optical axis AX such that an image plane IM is positioned between the third lens group Gr3 and the fourth lens group Gr4. Specifically, during zooming from the low magnification end (W) to the high magnification end (T), the third lens group Gr3 moves to the object side, while the fourth lens group Gr4 moves to the pupil EP side. In FIGS. 1 to 4, arrows m3 and m4 respectively indicate, in a schematic manner, movements of the third lens group Gr3 and the fourth lens group Gr4 during zooming from the low magnification end (W) to the high magnification end (T).

The erecting system PR is composed of two glass prisms, for example. Furthermore, outside each of the most object-side and most pupil EP-side lens elements, there may be disposed a transparent cover as a defense against cracks and chemicals, for example. The lens configuration of each embodiment will be described below. Here, optical powers are all based on paraxial values.

In the first, second and fourth embodiments (see FIGS. 1 and 5, FIGS. 2 and 4, and FIGS. 4 and 8, respectively), the variable-magnification observation optical systems LZ are each composed of, in order from the object side, a first lens group Gr1 composed of a cemented lens element formed of a positive lens element and a negative lens element and having a positive optical power as a lens group, an erecting system PR, a second lens group Gr2 composed of a positive meniscus lens element convex to the object side, a third lens group Gr3 composed of a biconcave negative lens element, a fourth lens group Gr4 composed of a single biconvex lens element having a positive optical power, and a fifth lens group Gr5 composed of a 5-1st lens element L51, a 5-2nd lens element L52, and a 5-3rd lens element L53. The 5-1st lens element L51 is a negative meniscus lens element concave to the object side, the 5-2nd lens element L52 is a negative meniscus lens element convex to the object side, and the 5-3rd lens element L53 is a biconvex positive lens element, which are arranged with a predetermined air gap provided between each adjacent ones thereof. All the lens elements constituting the variable-magnification observation optical systems LZ are spherical lens elements each of which is formed of a glass material.

In the third embodiment (see FIGS. 3 and 7), the variable-magnification observation optical system LZ is composed of, in order from the object side, a first lens group Gr1 composed of a cemented lens element formed of a positive lens element and a negative lens element and having a positive optical power as a lens group, an erecting system PR, a second lens group Gr2 composed of a biconvex positive lens element, a third lens group Gr3 composed of a single biconcave negative lens element, a fourth lens group Gr4 composed of a single biconvex lens element having a positive optical power, and a fifth lens group Gr5 composed of a 5-1st lens element L51, a 5-2nd lens element L52, and a 5-3rd lens element L53. The 5-1st lens element L51 is a negative meniscus lens element concave to the object side, the 5-2nd lens element L52 is a negative meniscus lens element convex to the object side, and the 5-3rd lens element L53 is a biconvex positive lens element, which are arranged with a predetermined air gap provided between each adjacent ones thereof. All the lens elements constituting the variable-magnification observation optical system LZ are spherical lens elements each of which is formed of a glass material.

EXAMPLES

Hereinafter, the configuration and other features of each of variable-magnification observation optical systems to which the present invention is applied will be described in more detail with reference to construction data, etc. of examples. Examples 1 to 4 (EX1 to EX4) presented below are numerical examples respectively corresponding to the first to fourth embodiments described above, and optical configuration diagrams (FIG. 1 to FIG. 4) and optical path diagrams (FIG. 5 to FIG. 8) showing the first to fourth embodiments each illustrating the lens configuration, the optical path, etc. of a corresponding one of Examples 1 to 4.

In the construction data of each example, listed as surface data are, in order from the leftmost column rightward, surface number, paraxial curvature radius r (mm), axial surface-to-surface distance d (mm), refractive index nd for the d-line (with a wavelength of 587.56 nm), and Abbe number vd for the d-line. Furthermore, listed as the entire length TL (mm) is the distance from the most object-side lens surface to the plane of pupil EP.

As miscellaneous data, magnification (×), diopter (Dpt), object distance (mm), shooting range (mm), and variable surface-to-surface distances D1 to D4 (mm) are listed with respect to the low magnification end (W) and the high magnification end (T). Table 1 shows the values for the conditional formulae as actually observed in each example, and Table 2 (miscellaneous data table) shows related data, etc. The miscellaneous data show values measured at the e-line, the values being represented by symbols as follows:

f1 to f5 respectively represent the focal lengths of the first to fifth lens groups;

fw represents the focal length of the entire optical system at the low magnification end;

ft represents the focal length of the entire optical system at the high magnification end;

fow represents the focal length of the objective system at the low magnification end;

fot represents the focal length of the objective system at the high magnification end;

few represents the focal length of the eyepiece system at the low magnification end;

fet represents the focal length of the eyepiece system at the high magnification end;

f34w represents the composite focal length of the third lens group and the fourth lens group at the low magnification end, f34t represents the composite focal length of the third lens group and the fourth lens group at the high magnification end, fL51 represents the focal length of the 5-1st lens element,
fL52 represents the focal length of the 5-2nd lens element,
fL53 represents the focal length of the 5-3rd lens element,
LT5 represents the distance on the optical axis from the pupil-side surface of the 5-1st lens element to the object-side surface of the 5-3rd lens element;

Ra represents the curvature radius of the object-side surface of the 5-1st lens element; and Rb represents the curvature radius of the pupil-side surface of the 5-1st lens element.

Figure 9A:
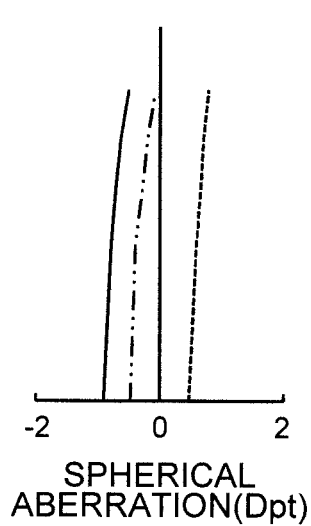
FIGS. 9A to 9F are aberration diagrams of Example 1.
Figure 9B:
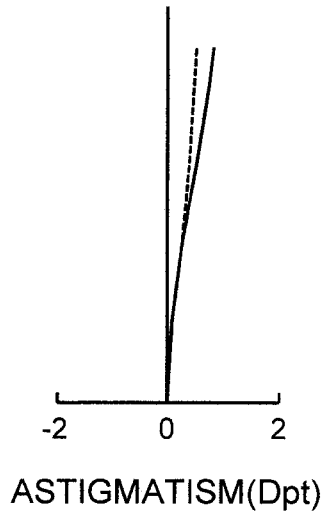
Figure 9C:
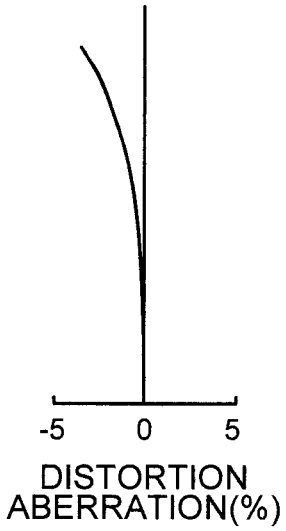
Figure 9D:
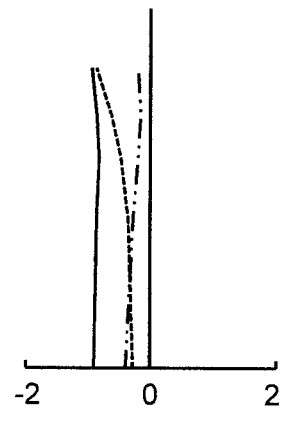
Figure 9E:
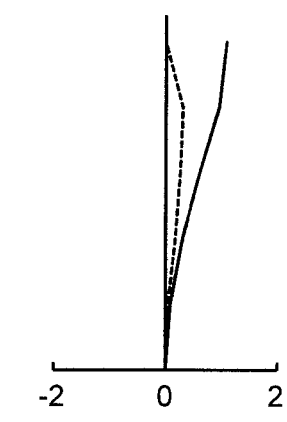
Figure 9F:
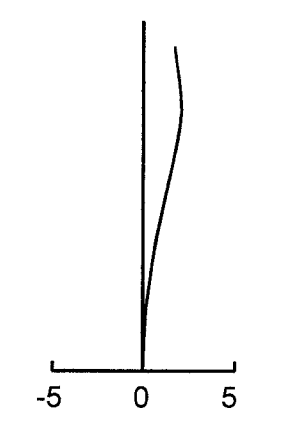
Figure 10A:
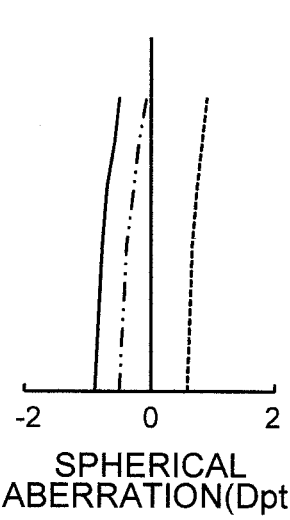
FIGS. 10A to 10F are aberration diagrams of Example 2.
Figure 10B:
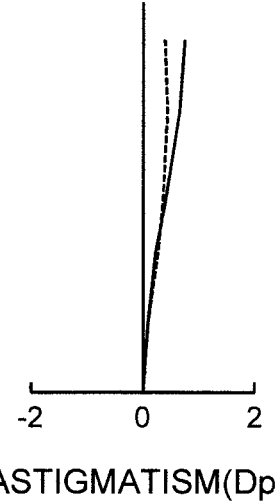
Figure 10C:
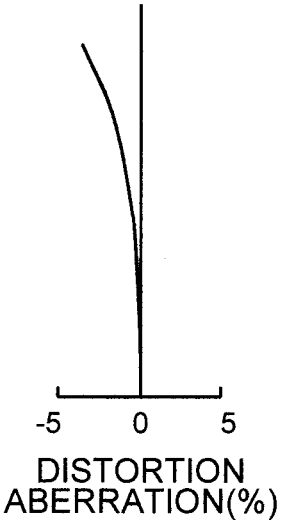
Figure 10D:
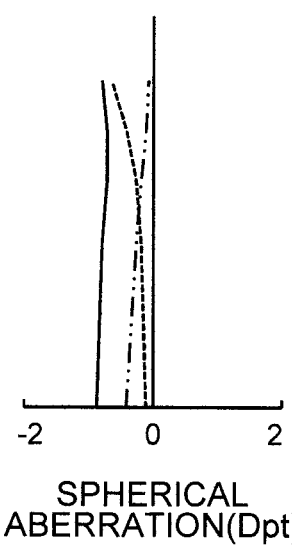
Figure 10E:
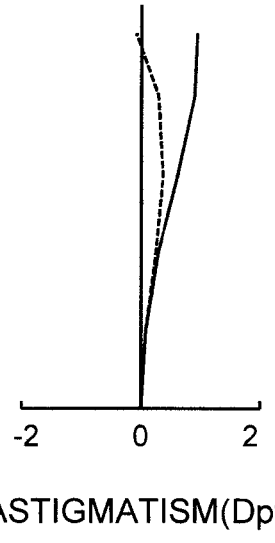
Figure 10F:
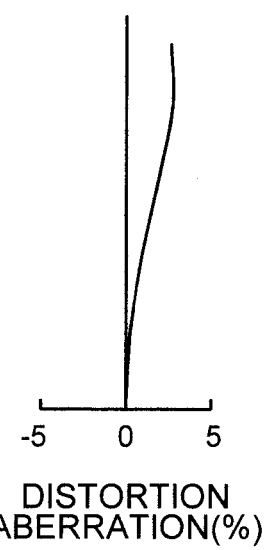
Figure 11A:
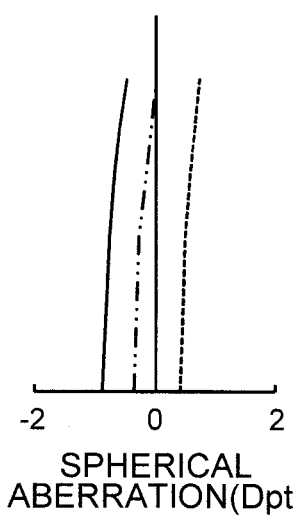
FIGS. 11A to 11F are aberration diagrams of Example 3.
Figure 11B:
Figure 11C:
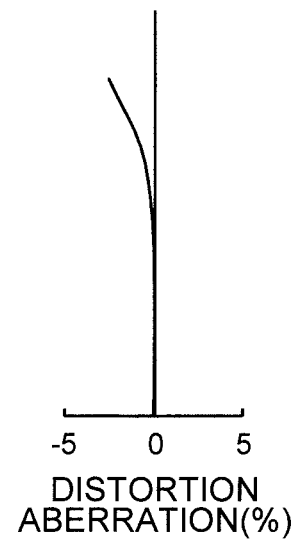
Figure 11D:
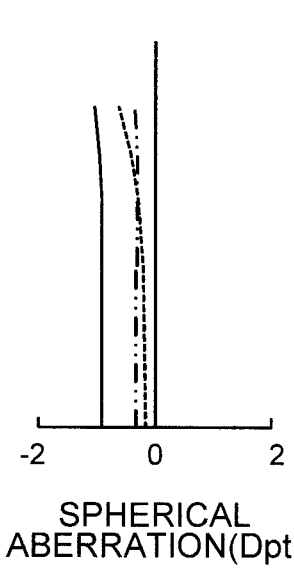
Figure 11E:
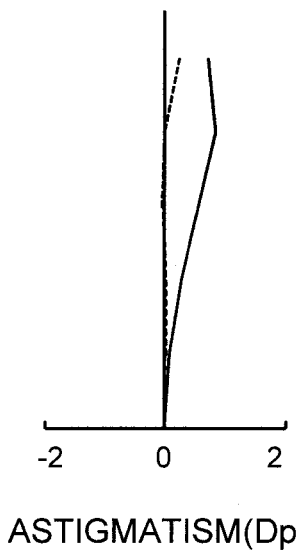
Figure 11F:
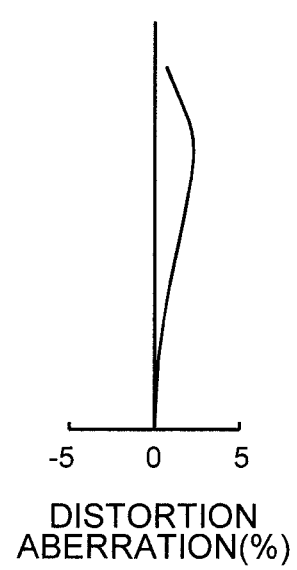
Figure 12A:
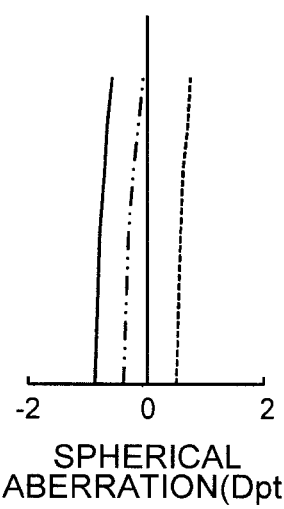
FIGS. 12A to 12F are aberration diagrams of Example 4.
Figure 12B:
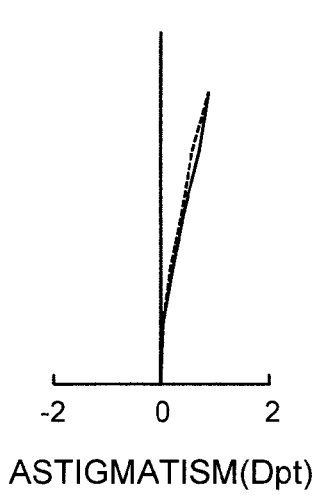
Figure 12C:
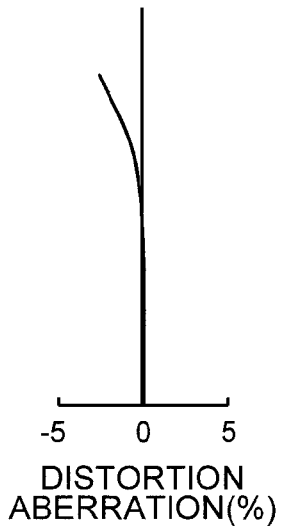
Figure 12D:
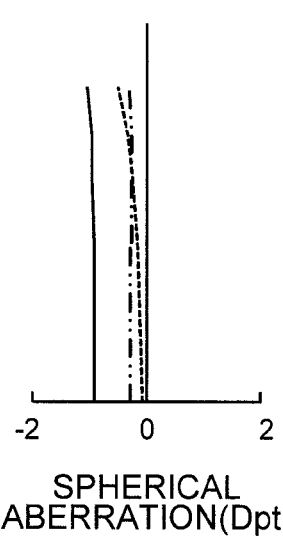
Figure 12E:
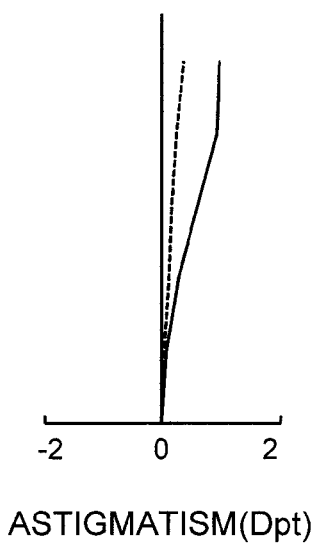
Figure 12F:
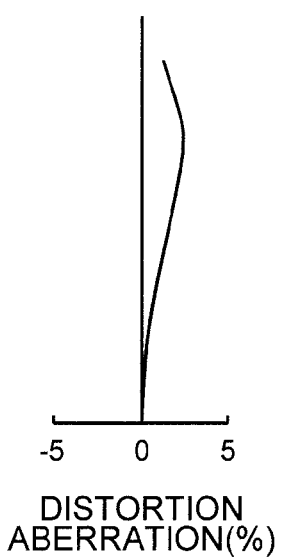

FIGS. 9A to 9F, 10A to 10F, 11A to 11F, and 12A to 12F are aberration diagrams respectively corresponding to Examples, 1, 2, 3, and 4 (EX1, EX2, EX3, and EX4). FIGS. 9A to 9C, 10A to 10C, 11A to 11C, and 12A to 12C show aberrations (in order from the left, spherical aberration, astigmatism, and distortion aberration) at the low magnification end (W) (the vertical axes representing the pupil radius, for example). FIGS. 9D to 9F, 10D to 10F, 11D to 11F, and 12D to 12F show aberrations (in order from the left, spherical aberration, astigmatism, and distortion aberration) at the high magnification end (T) (the vertical axes representing the pupil radius, for example). In each of the spherical aberration diagrams FIGS. 9A, 9D, 10A, 10D, 11A, 11D, 12A, and 12D, the solid line, the broken line, and the two-dot chain line respectively indicate the spherical aberrations (Dpt) for the e-line, the g-line, and the C-line. In each of the astigmatism diagrams FIGS. 9B, 9E, 10B, 10E, 11B, 11E, 12B, and 12E, the broken line and the solid line respectively indicate astigmatisms (Dpt) on a tangential plane and a sagittal plane. In each of the distortion aberration diagrams FIGS. 9C, 9F, 10C, 10F, 11C, 11F, 12C, and 12F, the solid line indicates distortion (%).

Example 1

Unit: mm

Surface Data

| Surface Number | r | d | nd | vd |
|---|---|---|---|---|
| 1 | 24.073 | 3.096 | 1.51680 | 64.20 |
| 2 | −23.620 | 0.700 | 1.68893 | 31.16 |
| 3 | −108.803 | 7.100 | | |
| 4 | ∞ | 18.134 | 1.70154 | 41.15 |
| 5 | ∞ | 0.500 | | |
| 6 | ∞ | 30.816 | 1.70154 | 41.15 |
| 7 | ∞ | 0.100 | | |
| 8 | 17.282 | 1.483 | 1.84666 | 23.78 |
| 9 | 40.727 | D1 | | |
| 10 | −15.989 | 0.800 | 1.48749 | 70.45 |
| 11 | 21.643 | D2 | | |
| 12 (Intermediate Image Plane) | ∞ | D3 | | |
| 13 | 200.184 | 3.296 | 1.83481 | 42.72 |
| 14 | −11.676 | D4 | | |
| 15 | −7.141 | 0.895 | 1.80518 | 25.46 |
| 16 | −11.853 | 1.855 | | |
| 17 | 63.340 | 0.700 | 1.54814 | 45.82 |
| 18 | 19.061 | 1.419 | | |
| 19 | 52.757 | 3.064 | 1.83481 | 42.72 |
| 20 | −13.526 | 12.500 | | |
| 21 (Pupil) | ∞ | | | |

TL = 108.990

Miscellaneous Data

| Magnification (x) | 3 | 5 |
|---|---|---|
| Diopter (Dpt) | −0.9 | −0.9 |
| Object Distance (mm) | 380 | 380 |
| Shooting Range (mm) | φ90 | φ65 |
| D1 | 8.167 | 3.770 |
| D2 | 1.800 | 9.214 |
| D3 | 2.781 | 4.374 |
| D4 | 8.883 | 4.273 |

Example 2

Unit: mm

Surface Data

| Surface Number | r | d | nd | vd |
|---|---|---|---|---|
| 1 | 22.578 | 3.075 | 1.51680 | 64.20 |
| 2 | −24.276 | 0.700 | 1.68893 | 31.16 |
| 3 | −174.592 | 7.100 | | |
| 4 | ∞ | 18.241 | 1.65844 | 50.86 |
| 5 | ∞ | 0.200 | | |
| 6 | ∞ | 32.830 | 1.65844 | 50.86 |
| 7 | ∞ | 0.100 | | |
| 8 | 12.504 | 1.689 | 1.84666 | 23.78 |
| 9 | 23.778 | D1 | | |
| 10 | −16.094 | 0.800 | 1.48749 | 70.45 |
| 11 | 14.535 | D2 | | |
| 12 (Intermediate Image Plane) | ∞ | D3 | | |
| 13 | 85.181 | 3.629 | 1.83481 | 42.72 |
| 14 | −12.331 | D4 | | |
| 15 | −7.314 | 0.900 | 1.69865 | 30.05 |
| 16 | −12.718 | 0.900 | | |
| 17 | 71.781 | 1.000 | 1.58144 | 40.89 |
| 18 | 18.511 | 1.853 | | |
| 19 | 51.449 | 3.498 | 1.83481 | 42.72 |
| 20 | −13.630 | 12.500 | | |
| 21 (Pupil) | ∞ | | | |

TL = 110.590

Miscellaneous Data

| Magnification (x) | 3 | 5 |
|---|---|---|
| Diopter (Dpt) | −0.9 | −0.9 |
| Object Distance (mm) | 380 | 380 |
| Shooting Range (mm) | φ90 | φ65 |
| D1 | 7.210 | 3.534 |
| D2 | 1.876 | 8.409 |
| D3 | 2.810 | 4.301 |
| D4 | 8.778 | 4.431 |

Example 3

Unit: mm

Surface Data

| Surface Number | r | d | nd | vd |
|---|---|---|---|---|
| 1 | 24.782 | 2.964 | 1.51680 | 64.20 |
| 2 | −20.464 | 0.800 | 1.64769 | 33.84 |
| 3 | −105.620 | 7.100 | | |
| 4 | ∞ | 19.195 | 1.65844 | 50.86 |
| 5 | ∞ | 0.200 | | |
| 6 | ∞ | 29.292 | 1.65844 | 50.86 |
| 7 | ∞ | 0.100 | | |
| 8 | 24.430 | 1.716 | 1.83481 | 42.72 |
| 9 | −108.460 | D1 | | |
| 10 | −14.417 | 0.800 | 1.56883 | 56.04 |
| 11 | 38.637 | D2 | | |
| 12 (Intermediate Image Plane) | ∞ | D3 | | |
| 13 | 121.517 | 3.437 | 1.83481 | 42.72 |
| 14 | −11.926 | D4 | | |
| 15 | −7.001 | 0.817 | 1.80610 | 33.27 |
| 16 | −11.107 | 2.339 | | |
| 17 | 506.640 | 1.257 | 1.76182 | 26.61 |
| 18 | 20.574 | 1.553 | | |
| 19 | 49.015 | 3.100 | 1.83481 | 42.72 |
| 20 | −12.517 | 12.500 | | |
| 21 (Pupil) | ∞ | | | |

TL = 107.990

Miscellaneous Data

| Magnification (x) | 2.5 | 4 |
|---|---|---|
| Diopter (Dpt) | −0.9 | −0.9 |
| Object Distance (mm) | 380 | 380 |
| Shooting Range (mm) | φ100 | φ80 |
| D1 | 6.979 | 3.024 |
| D2 | 1.807 | 8.406 |
| D3 | 2.517 | 3.998 |
| D4 | 8.617 | 4.493 |

Example 4

Unit: mm

Surface Data

| Surface Number | r | d | nd | vd |
|---|---|---|---|---|
| 1 | 24.929 | 3.063 | 1.61800 | 63.40 |
| 2 | −26.884 | 0.700 | 1.80610 | 33.27 |
| 3 | −283.570 | 7.100 | | |
| 4 | ∞ | 19.195 | 1.65844 | 50.86 |
| 5 | ∞ | 0.200 | | |
| 6 | ∞ | 29.292 | 1.65844 | 50.86 |
| 7 | ∞ | 0.100 | | |
| 8 | 17.235 | 1.683 | 1.83481 | 42.72 |
| 9 | 88.269 | D1 | | |
| 10 | −15.573 | 0.700 | 1.49700 | 81.61 |
| 11 | 23.035 | D2 | | |
| 12 (Intermediate Image Plane) | ∞ | D3 | | |
| 13 | 59.847 | 3.551 | 1.83481 | 42.72 |
| 14 | −13.141 | D4 | | |
| 15 | −7.316 | 0.800 | 1.67270 | 32.17 |
| 16 | −11.483 | 1.717 | | |
| 17 | 199.331 | 0.800 | 1.69895 | 30.05 |
| 18 | 20.008 | 2.740 | | |
| 19 | 86.622 | 2.845 | 1.83481 | 42.72 |
| 20 | −13.081 | 12.500 | | |
| 21 (Pupil) | ∞ | | | |

TL = 107.990

Miscellaneous Data

| | | |
|---|---|---|
| Magnification (x) | 2.5 | 4 |
| Diopter (Dpt) | −0.9 | −0.9 |
| Object Distance (mm) | 380 | 380 |
| Shooting Range (mm) | φ100 | φ80 |
| D1 | 6.197 | 2.476 |
| D2 | 2.374 | 8.712 |
| D3 | 2.297 | 3.908 |
| D4 | 9.238 | 4.957 |

TABLE 1

| Conditional Formulae | | Example 1 | Example 2 | Example 3 | Example 4 |
|---|---|---|---|---|---|
| (1) | LT5/few | 0.23 | 0.22 | 0.27 | 0.27 |
| (2) | f4/few | 0.76 | 0.75 | 0.70 | 0.67 |
| (3) | (Rb + Ra)/(Rb − Ra) | 4.03 | 3.71 | 4.41 | 4.51 |
| (4) | f34t/f34w | 0.57 | 0.53 | 0.59 | 0.60 |
| (5) | DA1 | <0.20 | <0.20 | <0.20 | 1.2≥, <2.2 |
| (6) | Hk1 | 595 | 595 | 595 | 445 |
| (7) | DS1 | <0.2 | <0.2 | <0.2 | 0.4≥, <0.6 |

TABLE 2

| Miscellaneous Data Table | | | Example 1 | Example 2 | Example 3 | Example 4 |
|---|---|---|---|---|---|---|
| Lens Group Focal Length (mm) | | f1 | 48.76 | 50.38 | 48.65 | 48.07 |
| | | f2 | 34.12 | 28.85 | 23.89 | 25.24 |
| | | f3 | −18.67 | −15.48 | −18.28 | −18.53 |
| | | f4 | 13.33 | 13.05 | 13.09 | 13.13 |
| | | f5 | 27.35 | 27.57 | 28.79 | 28.97 |
| Entire Optical System Focal Length (mm) | Low Magnification | fw | −175.71 | −176.44 | −216.00 | −215.27 |
| | High Magnification | ft | −101.11 | −101.41 | −127.72 | 127.62 |
| Objective System (Gr1-Gr3) Focal Length (mm) | Low Magnification | fow | 34.15 | 33.50 | 32.86 | 33.83 |
| | High Magnification | fot | 43.54 | 42.70 | 41.31 | 41.89 |
| Eyepiece System (Gr4-Gr5) Focal Length (mm) | Low Magnification | few | 17.5 | 17.4 | 18.8 | 19.5 |
| | High Magnification | fet | 14.3 | 14.3 | 15.6 | 16.0 |
| Gr3-Gr4 Composite Focal Length (mm) | Low Magnification | f34w | 20.6 | 22.2 | 20.6 | 20.3 |
| | High Magnification | f34t | 11.8 | 11.8 | 12.2 | 12.2 |
| L51 Focal Length (mm) | | fL51 | −24.16 | −26.24 | −25.61 | −32.25 |
| L52 Focal Length (mm) | | fL52 | −49.16 | −42.95 | −27.93 | −31.63 |
| L53 Focal Length (mm) | | fL53 | 13.10 | 13.16 | 12.16 | 13.72 |
| L51-L53 Distance (mm) | | LT5 | 3.974 | 3.753 | 5.149 | 5.256 |
| Curvature Radius of L51 | Object Side | Ra | −7.14 | −7.31 | −7.00 | −7.32 |
| | Pupil Side | Rb | −11.85 | −12.72 | −11.11 | −11.48 |

LZ variable-magnification observation optical system
LO objective system
LE eyepiece system
PR erecting system
Gr1 first lens group
Gr2 second lens group
Gr3 third lens group
Gr4 fourth lens group
Gr5 fifth lens group
L51 5-1st lens element (negative meniscus lens element)
L52 5-2nd lens element (negative meniscus lens element)
L53 5-3rd lens element (biconvex positive lens element)
IM image plane (erect image)
EP pupil
AX optical axis

The invention claimed is:

1. A variable-magnification observation optical system of a real-image type comprising:
   an objective system;
   an erecting system that converts an inverted image formed by the objective system into an erect image; and
   an eyepiece system that allows the erect image formed by the erecting system to be observed with a pupil,
   wherein the objective system includes, in order from an object side, a first lens group having a positive optical power, a second lens group having a positive optical power, and a third lens group having a negative optical power,
   wherein the eyepiece system includes, in order from the object side, a fourth lens group having a positive optical power and a fifth lens group having a positive optical power,
   wherein the erecting system is positioned between the first lens group and the second lens group,
   wherein zooming from a low magnification end to a high magnification end is performed by moving the third lens group and the fourth lens group in opposite directions from each other along an optical axis, with an image plane positioned between the third lens group and the fourth lens group,
   wherein the fifth lens group includes, in order from the object side, a negative meniscus lens element concave to the object side, a negative meniscus lens element convex to the object side, and a biconvex positive lens element, which are arranged with an air gap provided between each of the adjacent lens elements in the fifth lens group, and
   wherein conditional formula (2) below is fulfilled:

$$0.5 < f4/\text{few} < 0.8 \qquad (2)$$

where:
   f4 represents a focal length of the fourth lens group, and
   few represents a focal length of the eyepiece system at the low magnification end.

2. The variable-magnification observation optical system according to claim 1, wherein the second lens group and the third lens group are each composed of a single lens element.

3. The variable-magnification observation optical system according to claim 1, wherein lens surfaces constituting the fifth lens group are each spherical.

4. The variable-magnification observation optical system according to claim 1, wherein conditional formula (1) below is fulfilled:

$$0.2 < LT5/\text{few} < 0.3 \qquad (1)$$

where:
   the negative meniscus lens element concave to the object side in the fifth lens group being referred to as a 5-1st lens element, the positive lens element in the fifth lens group being referred to as a 5-3rd lens element,
   LT5 represents a distance on the optical axis from a pupil-side surface of the 5-1st lens element to an object-side surface of the 5-3rd lens element, and
   few represents a focal length of the eyepiece system at the low magnification end.

5. The variable-magnification observation optical system according to claim 1, wherein the first lens group, the second lens group, and the fifth lens group remain stationary in a direction of the optical axis during zooming.

6. The variable-magnification observation optical system according to claim 1, wherein the fourth lens group is composed of a single lens element.

7. The variable-magnification observation optical system according to claim 1, wherein the second lens group is a positive meniscus lens element convex to the object side.

8. A variable-magnification observation optical system of a real-image type comprising:
   an objective system;
   an erecting system that converts an inverted image formed by the objective system into an erect image; and
   an eyepiece system that allows the erect image formed by the erecting system to be observed with a pupil,
   wherein the objective system includes, in order from an object side, a first lens group having a positive optical power, a second lens group having a positive optical power, and a third lens group having a negative optical power,
   wherein the eyepiece system includes, in order from the object side, a fourth lens group having a positive optical power and a fifth lens group having a positive optical power,
   wherein the erecting system is positioned between the first lens group and the second lens group,
   wherein zooming from a low magnification end to a high magnification end is performed by moving the third lens group and the fourth lens group in opposite directions from each other along an optical axis, with an image plane positioned between the third lens group and the fourth lens group,
   wherein the fifth lens group includes, in order from the object side, a negative meniscus lens element concave to the object side, a negative meniscus lens element convex to the object side, and a biconvex positive lens element, which are arranged with an air gap provided between each of the adjacent lens elements in the fifth lens group, and
   wherein conditional formula (3) below is fulfilled:

$$3 < (Rb+Ra)/(Rb-Ra) < 5 \qquad (3)$$

where:
   the negative meniscus lens element concave to the object side in the fifth lens group being referred to as a 5-1st lens element,
   Ra represents a curvature radius of an object-side surface of the 5-1st lens element, and
   Rb represents a curvature radius of a pupil-side surface of the 5-1st lens element.

9. The variable-magnification observation optical system according to claim 8, wherein the second lens group is a positive meniscus lens element convex to the object side.

10. A variable-magnification observation optical system of a real-image type comprising:

an objective system;

an erecting system that converts an inverted image formed by the objective system into an erect image; and an eyepiece system that allows the erect image formed by the erecting system to be observed with a pupil, wherein the objective system includes, in order from an object side, a first lens group having a positive optical power, a second lens group having a positive optical power, and a third lens group having a negative optical power, wherein the eyepiece system includes, in order from the object side, a fourth lens group having a positive optical power and a fifth lens group having a positive optical power, wherein the erecting system is positioned between the first lens group and the second lens group, wherein zooming from a low magnification end to a high magnification end is performed by moving the third lens group and the fourth lens group in opposite directions from each other along an optical axis, with an image plane positioned between the third lens group and the fourth lens group, wherein the fifth lens group includes, in order from the object side, a negative meniscus lens element concave to the object side, a negative meniscus lens element convex to the object side, and a biconvex positive lens element, which are arranged with an air gap provided between each of the adjacent lens elements in the fifth lens group, and wherein conditional formula (4a) below is fulfilled:

$$0.5 < f34t/f34w < 0.65 \qquad (4a)$$

where:

$f34w$ represents a composite focal length of the third lens group and the fourth lens group at the low magnification end, and $f34t$ represents a composite focal length of the third lens group and the fourth lens group at the high magnification end.

11. The variable-magnification observation optical system according to claim 10, wherein the second lens group is a positive meniscus lens element convex to the object side.

* * * * *